Patented Aug. 21, 1928.

1,681,259

UNITED STATES PATENT OFFICE.

ARLIE W. SCHORGER, OF MADISON, WISCONSIN, ASSIGNOR TO C. F. BURGESS LABORATORIES, INC., OF MADISON, WISCONSIN, A CORPORATION OF DELAWARE.

PRIMING MIXTURE.

No Drawing. Application filed September 24, 1927. Serial No. 221,861.

This invention relates to a priming mixture for propellent explosives and containing graphitic acid as an essential constituent.

Primers in common use contain as their principal components mercury fulminate, potassium chlorate, and antimony sulphide. The fulminate detonates on shock and initiates the explosion. The potassium chlorate is a source of oxygen while the antimony sulphide serves as a fuel and presumably as a sensitizer.

Barium nitrate, barium peroxide, and similar compounds have been used in place of potassium chlorate but have not proved to be as satisfactory. Potassium chlorate has the defect of producing potassium chloride through liberation of its oxygen during the explosion. Potassium chloride is hygroscopic and unless the gun is very carefully cleaned after firing serious corrosion will take place in the bore whereby the accuracy of the arm is reduced.

Many attempts have been made with qualified success, to replace potassium chlorate with other compounds. I have found in graphitic oxide or acid a compound that serves both as an oxidizing agent and a fuel, and leaves no injurious residue. Deflagration of graphitic oxide produces carbon monoxide, carbon dioxide, and carbon. Graphitic oxide free from water, has apparently the formula $C_3O$ or $C_{11}O_4$. I do not wish, however, to limit myself to compounds of this formula but to solid oxides of carbon that deflagrate on heating.

Graphitic oxide or solid deflagrating oxides of carbon suitable for use in priming mixtures may be made by several methods. They may be made by the well known Brodie chemical oxidation method in which powdered graphite or highly calcined carbon is given repeated oxidizing treatments by means of a mixture of potassium chlorate and fuming nitric acid. Other highly oxidizing mixtures may also be used. If the oxidation of the carbon is carried to completion, a yellow product results which deflagrates on heating. The process may be stopped at an intermediate point where the product apparently is a mixture of graphitic oxide or some deflagrating oxides of carbon and unchanged carbon.

It is also possible to use a deflagrating oxide of carbon, which has the properties of a graphitic oxide, made by the electrochemical anodic oxidation of graphite as described in the Bruce K. Brown United States Patent No. 1,639,980, granted August 23rd, 1927. Graphite when subjected to anodic oxidation in solutions containing an oxygen containing anion, such as nitric acid or potassium chlorate, disintegrates and forms a black material which deflagrates when heated and appears to consist of a mixture of graphitic oxide and unchanged graphite. The available oxygen of this anodic product may be greatly increased by using graphite or highly calcined carbon anodes impregnated with a moisture repellent such as paraffin as described in O. W. Storey, et al., United States Patent No. 1,639,981, granted August 23rd, 1927. The available oxygen content is determined by the oxidation of ferrous sulphate or oxalic acid. Electrochemically prepared deflagrating oxides of carbon may contain as high as ten per cent of available oxygen as compared to 17 or 18 per cent in the pure yellow material made by chemical methods.

As examples of primers prepared from pure graphitic oxide, I may give the following:

I. Mercury fulminate _____ 80
  Graphitic oxide _____ 20
II. Mercury fulminate _____ 60
  Trinitro-toluene _____ 5
  Graphitic oxide _____ 35
III. Mercury fulminate _____ 30
  Picric acid _____ 10
  Graphitic oxide _____ 60

The above proportions will necessarily be changed to suit various conditions as is well known to those skilled in the art and also in proportion to the available oxygen present in the deflagrating oxide if the carbon or graphite is only partly oxidized.

In shells of certain sizes sufficient of the priming compound cannot be loaded into the space available for the priming mixture if a detonator and graphitic oxide are used alone in the priming mixture. When the oxygen content is low, a black bulky residue is left after combustion. In such instances, I contemplate the use of additional oxidizing materials, such as potassium chlorate, barium nitrate or barium peroxide in admixture with the graphitic oxide. The amount of additional oxidizing agent added will be such that the total oxygen content of the additional oxidizing agent and graphitic oxide will be sufficient to combine with all of the carbon present in the graphitic oxide and unchanged carbon present with the graphitic oxide. This, however, is unnecessary when the size of the shell is such that sufficient graphitic oxide may be loaded into the available space, and when the presence of a black bulky residue is not undesirable. In such instances the mercury fulminate and graphitic oxide may be used alone.

The priming compound is used in the shell or cartridge in the same manner as other priming compounds now in use. When the mercury fulminate is detonated by the blow of the hammer, the graphitic oxide serves as both the source of fuel and oxygen to cause the main charge of the shell or cartridge to be ignited. When it is used in admixture with another oxidizing agent, the oxygen of the other oxidizing agent and the oxygen of the graphitic oxide combine with the carbon of the graphitic oxide, and any free carbon present in admixture therewith, to cause the main charge to be ignited.

I claim:

1. A priming composition containing a solid deflagrating oxide of carbon.
2. A priming composition containing graphitic oxide.
3. A priming composition comprising mercury fulminate and graphitic oxide.
4. A priming composition comprising mercury fulminate, picric acid and graphitic acid.

In testimony whereof I affix my signature.

ARLIE W. SCHORGER.